(12) United States Patent
He

(10) Patent No.: US 7,422,322 B2
(45) Date of Patent: Sep. 9, 2008

(54) EYEGLASS FRAME

(76) Inventor: Junwei He, room 1808, 470# tong fu zhong road, guangzhou city, guangdong province (CN) 510220

( * ) Notice: Subject to any disclaimer, the term of this patent is extended or adjusted under 35 U.S.C. 154(b) by 130 days.

(21) Appl. No.: 11/566,315

(22) Filed: Dec. 4, 2006

(65) Prior Publication Data
US 2007/0247587 A1    Oct. 25, 2007

(30) Foreign Application Priority Data
Apr. 20, 2006    (WO) .................... PCT/CN06/00732

(51) Int. Cl.
*G02C 5/22*    (2006.01)
(52) U.S. Cl. .......................... 351/153; 351/121; 16/228
(58) Field of Classification Search ................ 351/111, 351/119, 121, 153; 16/228
See application file for complete search history.

(56) References Cited

U.S. PATENT DOCUMENTS
7,175,276 B1 * 2/2007 Hsiung ...................... 351/120

* cited by examiner

*Primary Examiner*—Huy K Mai
(74) *Attorney, Agent, or Firm*—Banger Shia

(57) ABSTRACT

An easily connected and assembled eyeglass frame comprises a frame, a pair of temples and two connecting assemblies, both sides of the frame are provided with a recess, the recess is provided with an upper and a lower column-shaped hole respectively. The connecting assembly is connected to the temple, two cantilevers extend from an upper end, an upper column protrudes upward from one of the cantilevers, a lower column protrudes downward from the other cantilever. The upper and lower columns are engaged in the upper and the lower column-shaped holes respectively. The top ends of the upper column and the upper column-shaped hole are provided with a cross-shaped shallow groove or a cross-shaped protrusion respectively that are engaged with each other. The frame and the temples are connected without using screws, which can reduce the cost. In addition, the temples are symmetrical, and the connecting assemblies have good elasticity.

4 Claims, 4 Drawing Sheets

EYEGLASS FRAME

BACKGROUND OF THE INVENTION

1. Field of the Invention

The present invention relates to a pair of eyeglasses, and more particularly to an easily connected and assembled eyeglass frame.

2. Description of the Prior Art

A frame and a support of a conventional pair of eyeglasses are usually connected by a connecting member via screws. When in use, on the one hand, the screws are too small and are likely to get loose and fall off, which cause inconvenience to the user. On the other hand, the conventional eyeglass frame is hard to assemble, which will waste time and is high cost.

The present invention has arisen to mitigate and/or obviate the afore-described disadvantages.

SUMMARY OF THE INVENTION

The primary objective of the present invention is to provide an eyeglass frame that is simplified in structure, easy to assemble and low cost, and the parts can be used repeatedly.

The easily connected and assembled eyeglass frame comprises a frame, a pair of temples and two connecting assemblies, which is characterized in that: both the right and left sides of the frame are provided with a recess, on the upper surface of the recess, an upper column-shaped hole is formed, and on the lower surface of the recess, a lower column-shaped hole is formed; the rear end of the connecting assembly is connected to the temple, and two cantilevers extend from the front end of the connecting assembly respectively; an upper column protrudes upward from one of the cantilevers, a lower column protrudes downward from the other cantilever, and the upper column and the lower column are inserted in the upper column-shaped hole and the lower column-shaped hole respectively; the top ends of the upper column and the upper column-shaped hole are provided with a cross-shaped shallow groove or a cross-shaped protrusion that are engaged with each other.

The rear end of the above-mentioned connecting assembly is a sheet-shaped main body formed with an engaging block on one side thereof. A side of an insertion groove of the frame is provided with an engaging hole, when the sheet-shaped main body is inserted into the insertion groove, the engaging block will be engaged in the engaging hole.

The cross-shaped shallow groove is provided on the top portion of the upper column and the cross-shaped protrusion is provided on the top portion of the upper column-shaped hole.

The frame and the temples of the present invention are connected without using screws, which can reduce the cost. In addition, the structure of the frame is compact, the temples are symmetrical and are parallel to each other when folding, and the connecting assemblies have good elasticity.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 3:
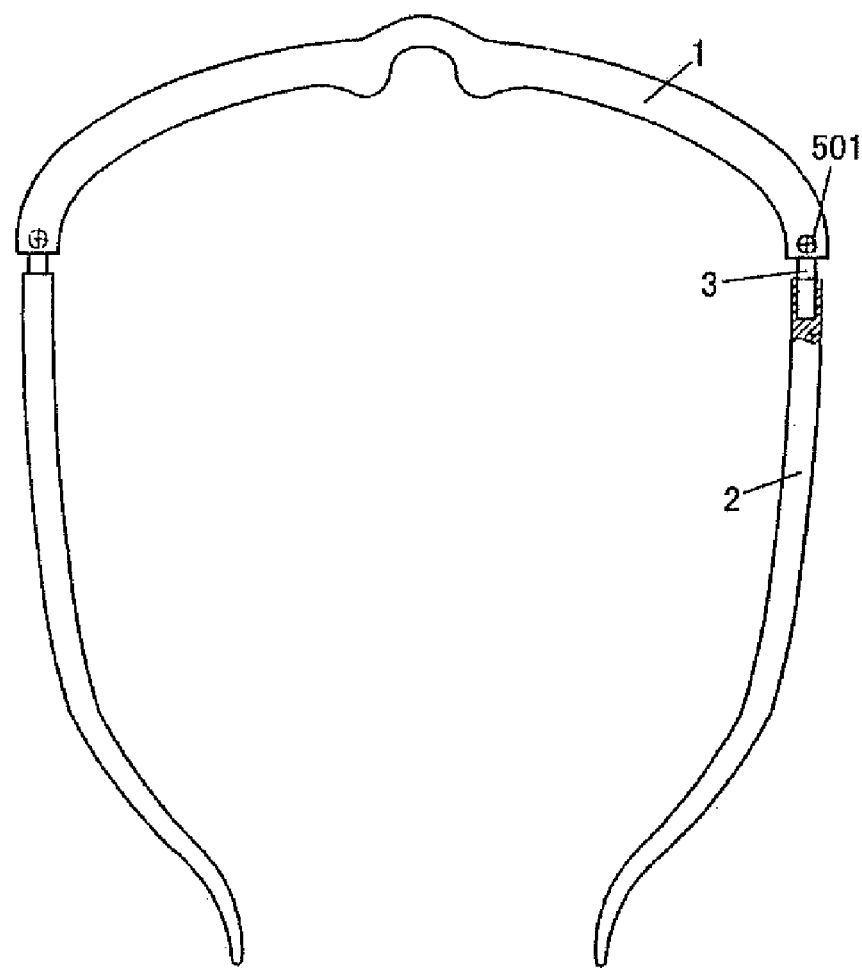
FIG. 3 is a perspective view of an eyeglass frame in accordance with the present invention.

Referring to FIG. 3, an easily connected and assembled eyeglass frame in accordance with the present invention comprises a frame 1, a pair of temples 2 and two connecting assemblies 3 for connecting the temples 2 to the frame 1.

Figure 1:
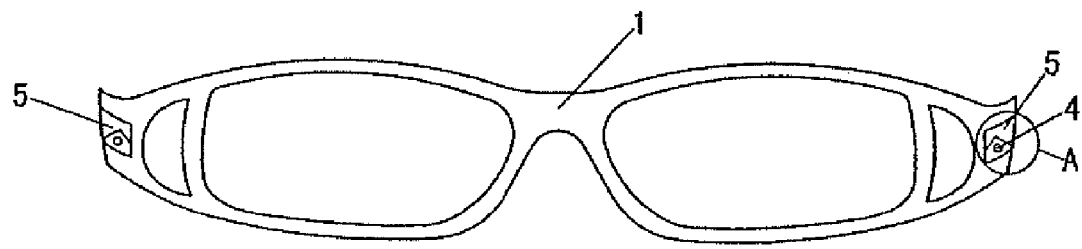
FIG. 1 is an front view of a frame in accordance with the present invention.
Figure 2:
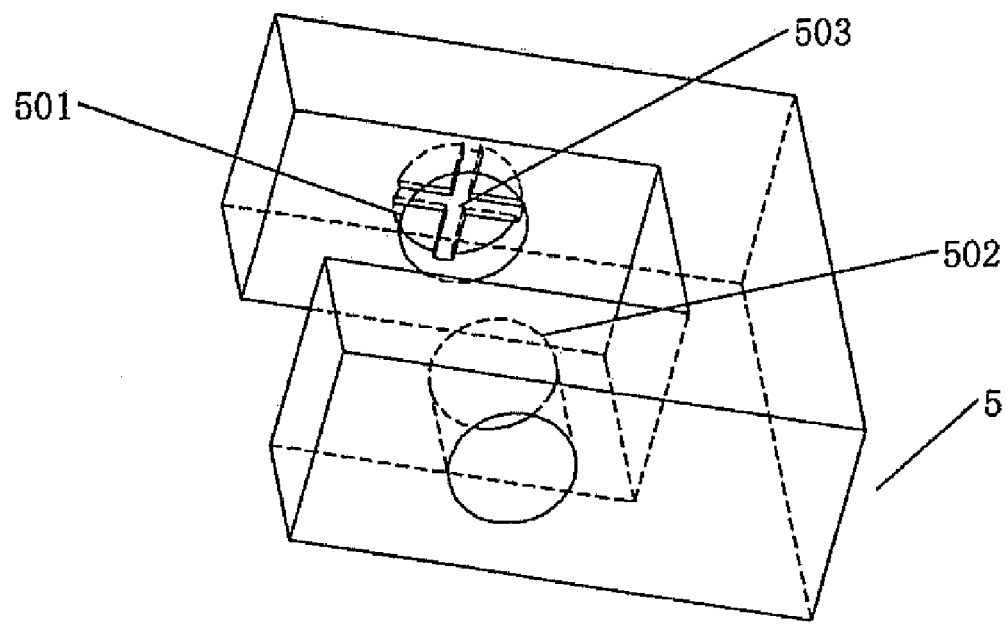
FIG. 2 is an enlarged view of a part A of the frame of FIG. 1.

Referring to FIG. 1, both the right and left sides of the frame 1 are provided with a recess 5. On an upper surface of the recess 5, an upper column-shaped hole 501 is provided, and on a lower surface of the recess 5, a lower column-shaped hole 502 is provided too. FIG. 2 is an amplified view of the recess 5 of the frame 1 of FIG. 1, wherein a cross-shaped protrusion 503 protrudes downward from the upper surface of the upper column-shaped hole 501.

Figure 4:
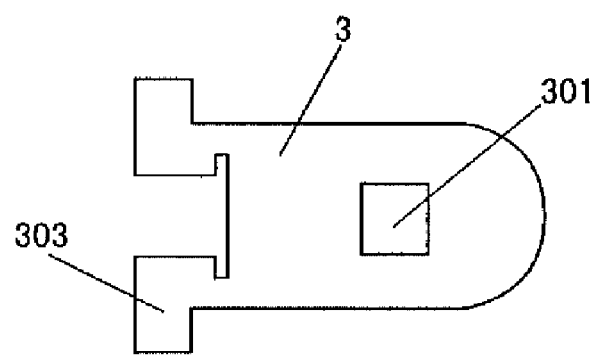
FIG. 4 is a side view of a connecting assembly in accordance with the present invention.
Figure 5:
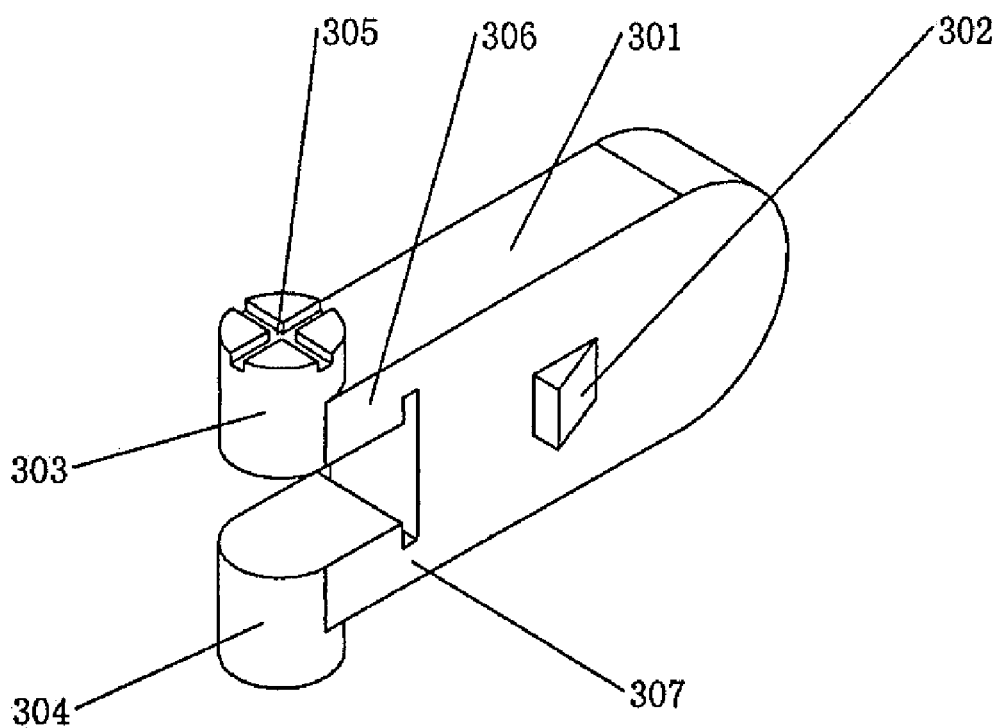
FIG. 5 is a perspective view of the connecting assembly in accordance with the present invention.
Figure 6:
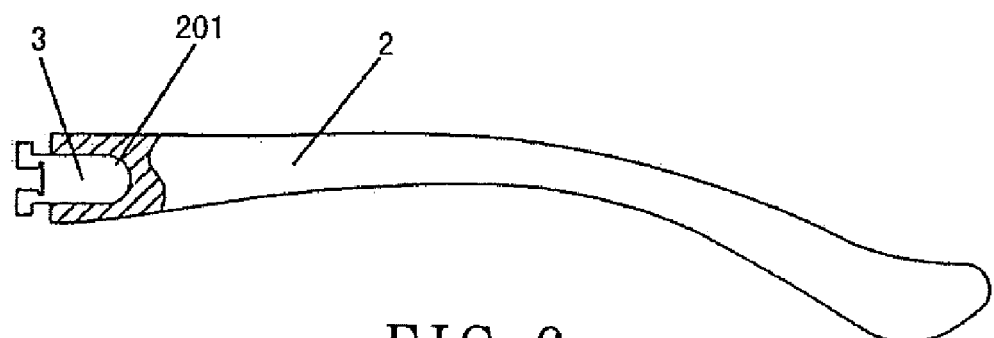
FIG. 6 is a perspective view of showing the connection of the temple and the connecting assembly.
Figure 7:
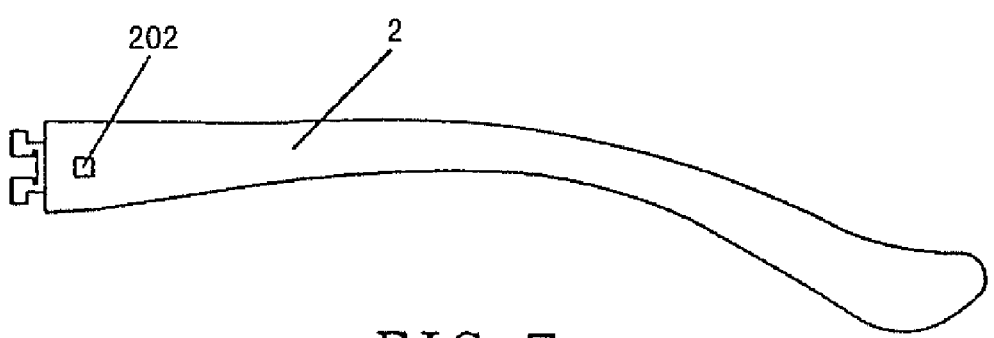
FIG. 7 is a rear view of FIG. 6.

With reference to FIGS. 4 and 5, the connecting assembly 3 has a sheet-shaped main body 301 for connecting to the temple 2, and an engaging block 302 is formed on one side of the sheet-shaped main body 301. One side of an insertion groove 201 of the frame 1 is provided with an engaging hole 202 as shown in FIGS. 6 and 7. When the sheet-shaped main body 301 is inserted into the insertion groove 201, the engaging block 302 will be engaged in the engaging hole 202, so that the sheet-shaped main body 301 is secured to the temple 2.

Figure 8:
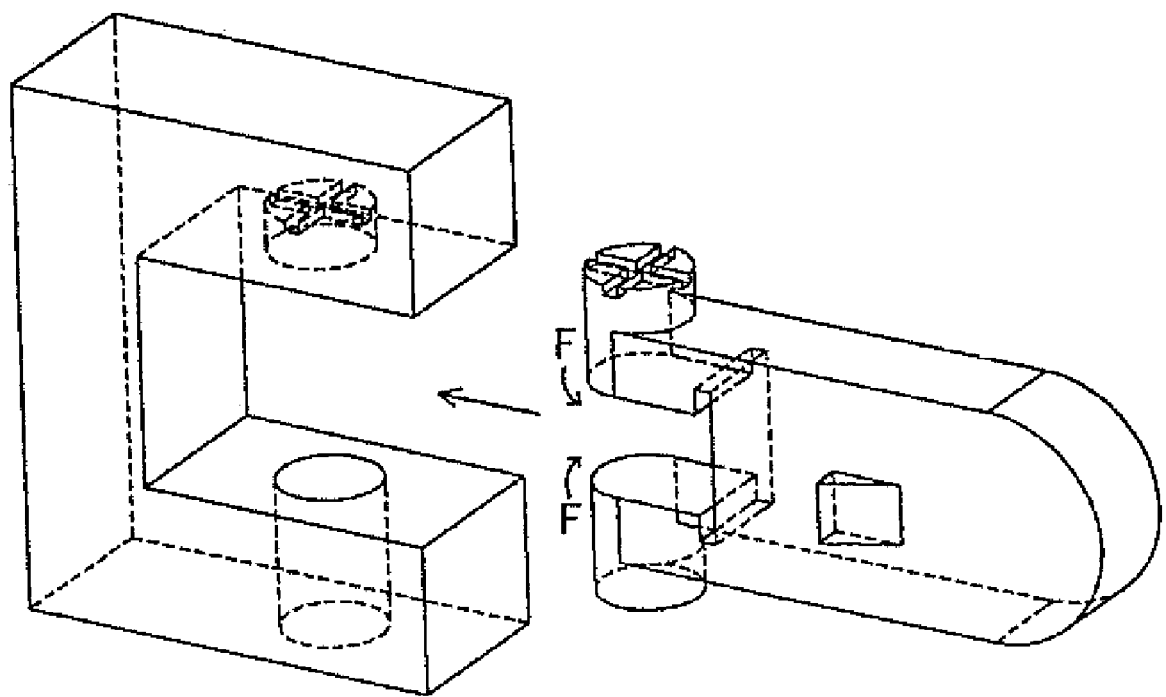
FIG. 8 is a perspective view of showing the connection of the connecting assembly and the frame in accordance with the present invention.

Referring further to FIGS. 4 and 5, A upper cantilever 306 and a lower cantilever 307 extend from a front end of the sheet-shaped main body 301 respectively. An upper column 303 protrudes upward from a rear end of the upper cantilever 306, and a lower column 304 protrudes downward from the rear end of the lower cantilever 307. Referring to FIG. 8, since the connecting assembly 3 is usually made of plastic or metal material, the cantilevers 306 and 307 have certain elasticity pressing the cantilevers 306 and 307 by force F shown in FIG. 8, the upper column 303 and the lower column 304 will move close to each other and can be inserted into the recess 5 of the frame 1. When the upper column 303 and the lower column 304 reach the upper column-shaped hole 501 and the lower column-shaped hole 502 respectively, the upper column 303 will be rebounded and inserted in the upper column-shaped hole 501, similarly, the lower column 304 will be rebounded and inserted in the lower column-shaped hole 502. Thereby, the temples 2 can be hinged to the frame 1, and the temples 2 and the frame can be folded.

However, the folded and unfolded states of the temples 2 are unstable, the temples will swing when subjected to a little force. In order to solve this problem, the top ends of the upper column 303 and the upper column-shaped hole 501 can be provided with a cross-shaped shallow groove or a cross-shaped protrusion respectively that are engaged with each other. In the present embodiment, a cross-shaped shallow groove 305 is provided on the top portion of the upper column 303 and a cross-shaped protrusion 503 is provided on the top portion of the upper column-shaped hole 501. However, as a substitution way, the cross-shaped shallow groove 305 can be provided on the top portion of the upper column-shade hole 501 and the cross-shaped protrusion 503 can be provided on the top portion of the upper column 303, which will has the same effect with that of the present embodiment. By such arrangements, when the temples 2 are folded, the cross-shaped shallow groove 305 is engaged with the cross-shaped protrusion 503, so the temples 2 will not swing. Only when the torque strength pressed on the temples is rather big, since the cross-shaped groove 305 is shallow and the cantilever 306 has certain elasticity, the cross-shaped shallow groove 305 will be disengaged from the cross protrusion 503, the temples 2 can swing freely until the temples 2 are stretched completely to the condition shown in FIG. 3. The cross-shaped shallow groove 305 is engaged with the cross-shaped protrusion 503 again, the temples 2 can not swing and are in a stable unfolded state. At this moment, when the user wants to fold the temples 2, he should press the temples 2 with a relatively great force, which has the same process with the afore said unfolding process. To summarize, with the engagement of the cross-shaped shallow groove 305 and the cross-shaped protrusion 503, the temples 2 can be folded and unfolded stably.

While we have shown and described various embodiments in accordance with the present invention, it should be clear to those skilled in the art that further embodiments may be made without departing from the scope of the present invention.

What is claimed is:

1. An easily connected and assembled eyeglass frame, comprising a frame, a pair of temples and two connecting assemblies, which is characterized in that:
    both the right and left sides of the frame are provided with a recess, an upper surface of the recess is provided with an upper column-shaped hole, a lower surface of the recess is provided with a lower column-shaped hole; and
    a rear end of the connecting assembly is connected to the temple, two cantilevers extend from a front end of the connecting assembly respectively, an upper column protrudes upward from one of the cantilevers, a lower column protrudes downward from the other cantilever; and
    the upper column and the lower column are inserted in the upper column-shaped hole and the lower column-shaped hole respectively; and
    both top ends of the upper column and the upper column-shaped hole are provided with a cross-shaped shallow groove or a cross-shaped protrusion respectively that are engaged with each other.

2. The easily connected and assembled eyeglass frame as claimed in claim 1, which is characterized in that: the rear end of the connecting assembly is a sheet-shaped main body formed with an engaging block on one side thereof, and a side of an insertion groove of the frame is provided with an engaging hole, and the sheet-shaped main body is inserted into the insertion groove with the engaging block engaged in the engaging hole.

3. The easily connected and assembled eyeglass frame as claimed in claim 1, which is characterized in that: the cross-shaped shallow groove is provided on the top portion of upper column and the cross-shaped protrusion is provided on the top portion of the upper column-shaped hole.

4. The easily connected and assembled eyeglass frame as claimed in claim 1, which is characterized in that: the cross-shaped shallow groove is provided on the top portion of the upper column-shaped hole and the cross-shaped protrusion is provided on the top portion of upper column.

* * * * *